United States Patent [19]

Suzuki et al.

[11] Patent Number: 5,728,286
[45] Date of Patent: Mar. 17, 1998

[54] METHOD OF MANUFACTURING EXTRUSION DIE FOR EXTRUDING HONEYCOMB STRUCTURAL BODY

[75] Inventors: Kazuo Suzuki, Inazawa; Shoji Futamura, Kawasaki, both of Japan

[73] Assignees: NGK Insulators, Ltd.; Institute of Technology Precision Electrical Discharge Works, both of Japan

[21] Appl. No.: 694,257

[22] Filed: Aug. 8, 1996

[30] Foreign Application Priority Data

Aug. 21, 1995 [JP] Japan .................. 7-211675

[51] Int. Cl.$^6$ .................. B23H 9/14; B23H 3/00
[52] U.S. Cl. .................. 205/640; 205/646; 205/660; 205/665; 205/672
[58] Field of Search .................. 205/665, 660, 205/640, 646, 672

[56] References Cited

U.S. PATENT DOCUMENTS

| | | | |
|---|---|---|---|
| 5,320,721 | 6/1994 | Peters | 205/665 X |
| 5,322,599 | 6/1994 | Peters | 205/665 X |
| 5,402,692 | 4/1995 | Bennett | 76/107 |
| 5,507,925 | 4/1996 | Brew | 205/665 X |

FOREIGN PATENT DOCUMENTS

| | | |
|---|---|---|
| 0017686 | 10/1980 | European Pat. Off. . |
| 2187552 | 8/1983 | France . |
| 51-20435 | 8/1978 | Japan . |
| 58-147837 | 11/1981 | Japan . |
| 1-25652 | 5/1989 | Japan . |

*Primary Examiner*—Donald R. Valentine
*Attorney, Agent, or Firm*—Parkhurst & Wendel

[57] ABSTRACT

A method of manufacturing an extrusion die for extruding a honeycomb structural body is disclosed. The extrusion die has a plurality of forming channels which have a shape in a traverse cross section corresponding to that of the honeycomb structural body and have a predetermined depth from a front side of the extrusion die toward a back side, and a plurality of opening holes for feeding raw materials which have a cylindrical shape extending independently from the back side toward the front side and are arranged at a cross portion and/or a straight portion of the forming channels in such a manner that each opening hole is opened and connected to the cross portion and/or straight portion of the forming channels. The method includes the steps of, inserting, into the cross portion of the forming channels, an electrode having a circular shape in a traverse cross section and a length corresponding to the depth of the forming channel, and performing an electrolytic machining by using the electrode so as to make a corner portion of a cell surrounded by the forming channels an arcuate shape in a traverse cross section.

5 Claims, 7 Drawing Sheets

FIG_1
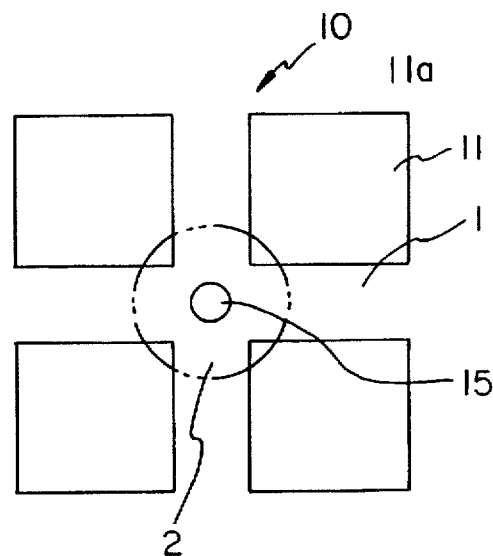
FIG_2
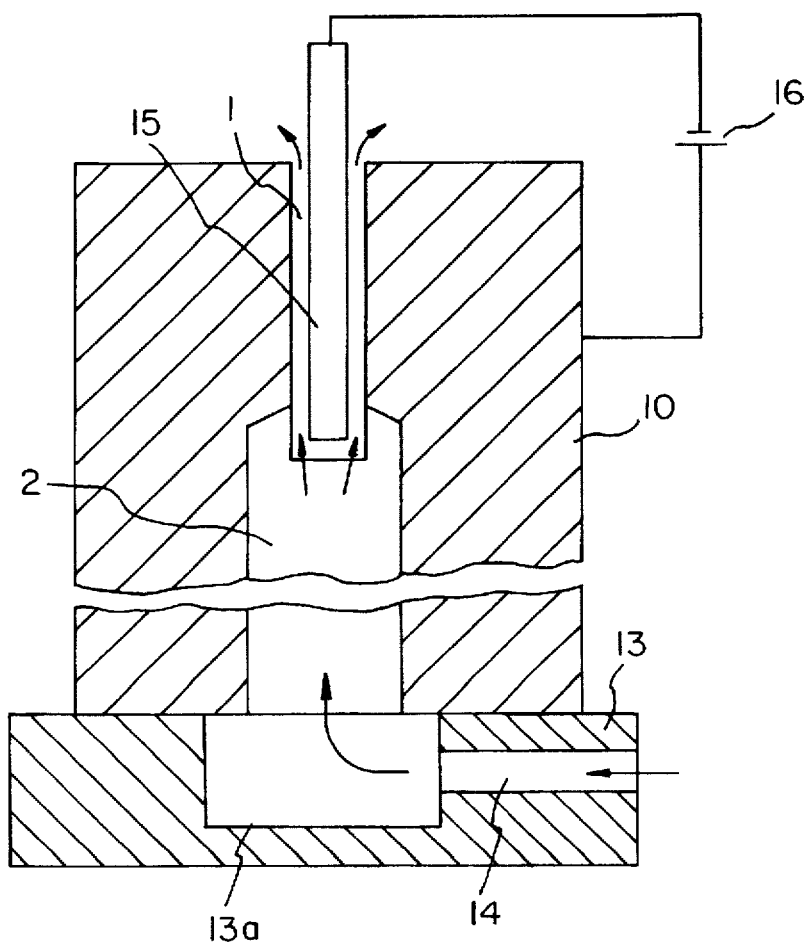

FIG_3
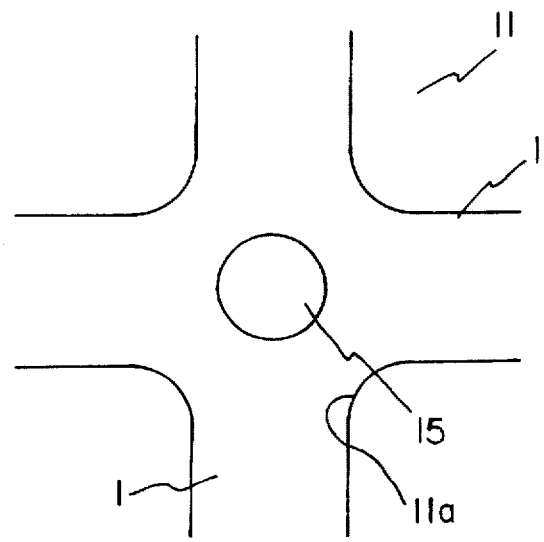
FIG_4
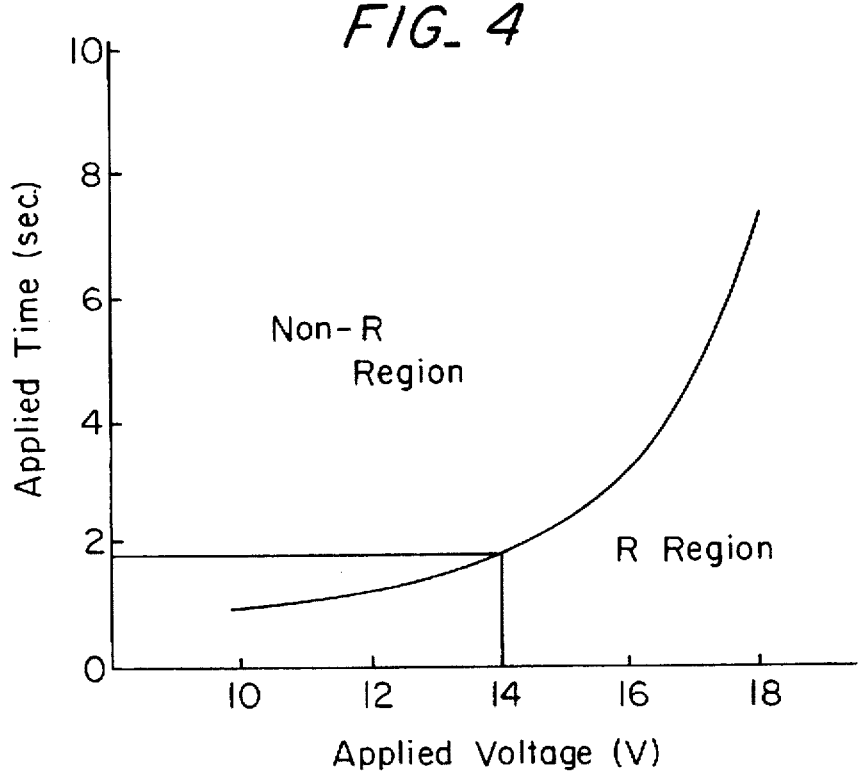

METHOD OF MANUFACTURING EXTRUSION DIE FOR EXTRUDING HONEYCOMB STRUCTURAL BODY

BACKGROUND OF THE INVENTION

1. Field of the Invention

The present invention relates to a method of manufacturing an extrusion die for extruding a honeycomb o structural body, and especially relates to a method of manufacturing an extrusion die in which corner portions of cells surrounded by forming channels are shaped arcuately in a traverse section by electrolytic machining using an electrode having a circular cross section.

2. Related Art Statement

As a catalyst carrier for purifying an exhaust gas from a combustion engine and so on, a filter for trapping particulates, a thermostat and so on, a honeycomb structural body is used usually. The honeycomb structural body is made of ceramic materials such as cordierite, alumina, silicon carbide, silicon nitride, mullite and so on, and is generally formed by extruding ceramic materials mentioned above by using an extrusion die.

FIGS. 8a and 8b are schematic views for explaining one embodiment of a known extrusion die, where FIG. 8a is a front plan view and FIG. 8b is a cross section along an A—A line. In FIGS. 8a and 8b, numeral 1 is a forming channel having a shape in a traverse cross section corresponding to that of the honeycomb structural body. The forming channel 1 has a predetermined depth from a front side of a die 10 (left side in FIG. 8b) toward a back side (right side in FIG. 8b). A plurality of the forming channels 1 are arranged in a matrix form. A numeral 2 is an opening hole for feeding raw materials having a cylindrical shape extending independently from a back side of the die 10 toward a front side. A plurality of the opening holes 2 are arranged at a cross portion of the forming channels 1 respectively in such a manner that each opening holes 2 is opened at and connected to the cross portion of the forming channels 1. In other cases, the opening holes 2 may be arranged in such a manner that each opening hole 2 is opened at and connected to a straight portion of the forming channels 1. A numeral 3 is a step portion for engaging, and is arranged at a front side of the extrusion die 10. In other cases, the step portion 3 is eliminated and the extrusion die 10 is engaged at an outer front surface of the extrusion die 10.

FIG. 10 is a cross sectional view of a main portion showing an extrusion operation of a honeycomb structural body 7. In FIG. 10, portions similar to those of FIGS. 8a and 8b are denoted by the same reference numerals. In FIG. 10, a numeral 4 is a cylinder and accommodates raw materials 5 made of ceramic materials. As shown in FIG. 10, the extrusion die 10 is set to a lower end of the cylinder 4 by engaging the step portion 3 with a clamp 6, and a pressure P is applied to the raw materials 5 accommodated in the cylinder 4 by means of a piston or a screw not shown.

The raw materials 5 to which a pressure P is applied are introduced under pressure into the opening holes 2 of the die 10, and further introduced under pressure into the forming channels 1 connected to the opening holes 2. In this case, since one opening hole 2 is opened at the cross portion of the forming channels 1, the raw materials 5 introduced from the one opening hole 2 are introduced under pressure into a plurality of the forming channels 1 (four forming channels in FIGS. 8a–8b and 9), and also mixed and moved in the forming channels 1 with the raw materials 5 introduced from the other opening hole 2. Therefore, the raw materials 5 are extruded from the extrusion die 10 as a honeycomb shape to form the honeycomb structural body 7.

FIG. 11 is a perspective view showing one embodiment of the honeycomb structural body 7. In FIG. 11, the honeycomb structural body 7 has a construction such that a plurality of through holes 9 for passing an exhaust gas are formed by means of a partition wall 8 having a checker form. The honeycomb structural body thus formed is dried and fired, and then catalyst materials such as platinum, nickel and so on are arranged on a surface of the partition wall 8 to which the through hole 9 is faced to form a catalyst device. The catalyst device thus obtained is then ready for use.

In the honeycomb structural body 7 shown in FIG. 11, a cross portion 8a of the partition wall 8 has corner portions. Therefore, when the honeycomb structural body 7 is heated and cooled during the drying step and the firing step, a stress is concentrated to the corner portions by an uneven expansion or shrinkage generated due to a thermal conduction difference between a center portion and a peripheral portion in the honeycomb structural body 7. In this case, a crack is liable to be generated in the honeycomb structural body 7, and in an extreme case the honeycomb structural body 7 is fractured. Moreover, in actual cases, a stress concentration and fractures are liable to be generated at the corner portions due to the same reasons mentioned above.

Further, if the partition wall 8 is made thinner, a strength of the extruded honeycomb structural body 7 becomes low. Therefore, a deformation of the honeycomb structural body 7 is liable to be generated, and thus it is not possible to obtain the honeycomb structural body 7 having a predetermined high precision in shape. In order to avoid this problem, it is necessary to make a transverse section of the corner portion into an arcuate shape so as to decrease the stress concentration mentioned above or to improve a strength of the extruded honeycomb structural body 7. Therefore, in the extrusion die 10 shown in FIG. 8, the corner portions of cells 11 surrounded by the forming channels 1 are formed arcuately in a traverse section as shown in FIG. 9.

FIG. 12 is an enlarged plan view showing corner portions 11a of the cells 11. In FIG. 12, portions similar to those of FIG. 9 are denoted by the same reference numerals in FIG. 9. In FIG. 12, a numeral 12 is an electrode for use in an electrical discharge machining which is made of conductive materials such as copper, copper-tungsten, graphite and so on. The electrode 12 has a pseudo cross shape in a transverse section in which four concave cylindrical surfaces 12a are arranged. Then, the electrode 12 is set at a center of the cross portion of the forming channels 1, and an electrical discharge machining is performed to make the corner portions of the cells 11 to an arcuate shape in a transverse section. In another case, the corner portions of the cells 11 may be worked by a cutting.

However, the machining methods of the corner portions mentioned above have the following problems. In the electrical discharge machining, there are following (1)–(4) problems.

(1) The shape in a transverse section of the electrode 12 for the electrical discharge machining is complicated. In addition, when a width of the forming channel 1 is thin such as for example less than 0.3 mm, a machining of the electrode 12 becomes extremely complicated. Therefore, a machining cost of the electrode 12 becomes extremely higher, and thus a cost of manufacturing the extrusion die is increased.

(2) The electrode 12 is worn during the electrical discharge machining. Therefore, it is necessary to prepare large numbers of the electrodes 12 for the electrical discharge machining. When machining a extrusion die having 3,000-30,000 cells, the number of the electrodes 12 to be prepared is larger, and thus it is extremely difficult to perform an electrode control such as a dimension precision control of the electrode.

(3) The electrode 12 is worn during the electrical discharge machining as mentioned above. Therefore, it is difficult to make the same arcuate shape of the corner portion of the cell 11 along a depth direction of the forming channel 1, and thus it is also difficult to improve machining precision.

(4) When each forming channel 1 has a different width dimension and a different arcuate shape, it is necessary to make a new electrode 12 every time the forming channel 1 is machined. Therefore, it is difficult to use the same electrode 12 for all the forming channels 1 mentioned above.

On the other hand, in the cutting, there are the following (1)-(2) problems when the corner portion is machined.

(1) From the view points of a cutting resistance and tools to be used, it is difficult to perform a highly precise machining. Therefore, a machining precision is varied largely.

(2) When a width of the forming channel 1 is for example less than 0.3 mm, it is impossible to perform a cutting operation actually.

SUMMARY OF THE INVENTION

It is an object of the present invention to eliminate the drawbacks mentioned above and to provide a method of manufacturing an extrusion die for extruding a honeycomb structural body in which a predetermined arcuate shape of a corner portion of a cell can be machined precisely even if the extrusion die has a narrow forming channel.

According to the present invention, a method of manufacturing an extrusion die for extruding a honeycomb structural body, said extrusion die having a plurality of forming channels which have a shape in a traverse cross section corresponding to that of said honeycomb structural body and have a predetermined depth from a front side of said extrusion die toward a back side, and a plurality of opening holes for feeding raw materials which have a cylindrical shape extending independently from said back side toward said front side and are arranged at a cross portion and/or a straight portion of said forming channels in such a manner that each opening holes is opened and connected to said cross portion and/or straight portion of said forming channels, comprises the steps of, inserting, into said cross portion of said forming channels, an electrode having a circular shape in a traverse cross section and a length corresponding to at least said depth of said forming channel, and performing an electrolytic machining by using said electrode so as to make a corner portion of a cell surrounded by said forming channels an arcuate shape in a traverse cross section.

In the present invention, the arcuate shape of the corner portion of the cell can be formed by suitably selecting at least one condition from a group of kind of electrolytic solution, concentration of electrolytic solution, temperature and flow mass, distance between electrode and cell, applied voltage, and voltage applied time.

Moreover, in the present invention, it is possible to use a plurality of electrodes at the same time. Therefore, in the case that the number of the cells to be machined is large, this feature is effective to make a whole machining time shorter.

Further, in the present invention, it is possible to form the arcuate shapes each having a different curvature at the corner portions in the same extrusion die. Therefore, it is possible to obtain the extrusion die in which the curvature is small in a center portion and is large in a peripheral portion. Moreover, it is possible to obtain the extrusion die in which the curvature is gradually varied from a center portion to a peripheral portion.

Furthermore, according to the present invention, it is possible to make a width of the forming channel to 0.05 –0.3 mm, and thus it is possible to obtain the extrusion die having a narrow forming channel easily.

BRIEF DESCRIPTION OF THE DRAWINGS

FIG. 1 is a plan view showing a main portion of an extrusion die to which the present invention is applied;

FIG. 2 is a schematic view illustrating a state in which an electrolytic machining is performed;

FIG. 3 is an enlarged plan view depicting a state in which a corner portion of a cell is machined by an electrolytic machining;

FIG. 4 is a graph showing a relation between an applied voltage and an applied time;

FIG. 8a is a plan view illustrating a front side of one embodiment of the known extrusion die and FIG. 8b is a cross sectional view cut along A—A line in FIG. 8a;

DESCRIPTION OF THE PREFERRED EMBODIMENT

Figure 10:
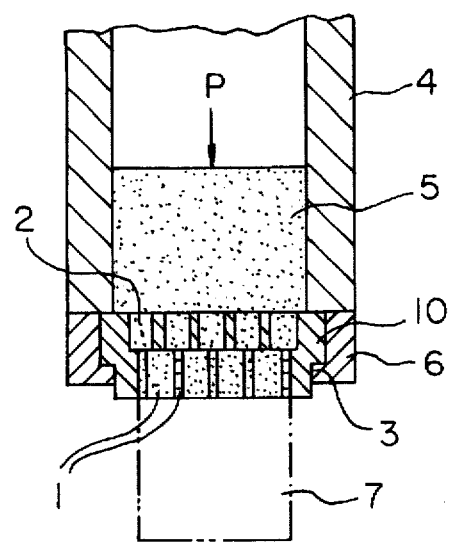
FIG. 10 is a cross sectional view showing a state in which a honeycomb structural body is extruded.

FIG. 1 is a plan view showing a main portion of an extrusion die to which the present invention is applied, and FIG. 2 is a schematic view illustrating a state in which an electrolytic machining is performed. In FIGS. 1 and 2, portions similar to those of FIGS. 8 and 10 are denoted by the same reference numerals in FIGS. 8 and 10. In FIGS. 1 and 2, a numeral 13 is a base. In the base 13, a depression hole 13a is arranged at a position corresponding to an opening hole 2 for feeding raw materials, and an inlet hole 14, through which an electrolytic solution is introduced, is communicated with the depression hole 13a. A numeral 15 is an electrode made of materials having a conductivity and a large stiffness. The electrode 15 has a circular 1. A numeral 16 is a DC power supply. The electrode 15 is connected to a negative side of the DC power supply 16, and the extrusion die 10 is connected to a positive side of the DC power supply 16.

In the construction mentioned above, an electrolytic solution is passed through the inlet hole 14, the depression hole 13a, the opening hole 2, and the forming channel 1, and a DC voltage is applied between the electrode 15 and the extrusion die 10 by means of the DC power supply 16. Under such a condition, it is possible to form a corner portion 11a of a cell 11 into an arcuate shape in a traverse cross section by the electrolytic machining. In this case, a metal ion is adhered to the electrode 15, but the adhered metal ion can be removed by a flow of the electrolytic solution in the forming channel 1.

FIG. 3 is an enlarged plan view showing a state in which the corner portion 11a of the cell 11 is machined by an electrolytic machining. In the embodiment shown in FIG. 3, it is understood that the corner portion 11a of the cell 11 opposed to the electrode 15 is formed into an arcuate shape in a traverse cross section.

FIG. 4 is a graph showing a relation between an applied voltage and an applied time. The result shown in FIG. 4 is measured under the following conditions. That is to say, the extrusion die 10 is made of a stainless steel (SUS630), and has a width of 0.14 mm and a depth of 0.3 mm both of the forming channel 1. Moreover, the electrode 15 is made of for example WC—Co series hard metal and has a diameter of 0.1 mm. Further, the electrode 15 is arranged at a cross portion of the forming channel 1. As for the electrolytic solution, use is made of 10 wt% of sodium nitrate solution.

In FIG. 4, an upper region and a lower region divided by a curved line are denoted by a non-R region and an R region respectively. In the condition shown in FIG. 4, if the electrolytic machining is performed under such a condition that the applied voltage is 14 V and the applied time is more than 1.9 sec., the machining result exists in the non-R region. Moreover, if the electrolytic machining is performed under such a condition that the applied voltage is 14 V and the applied time is not more than 1.9 sec., the machining result exists in the R region. In the present invention, it is necessary to perform the electrolytic machining at which a combination of the applied voltage and the applied time exists in the R region. That is to say, in the present invention, it is found that there are the R region and the non-R region in the electrolytic machining using the electrode having a circular cross section and the electrode machining must be performed in the R region by selecting machining conditions suitably.

Figure 5:
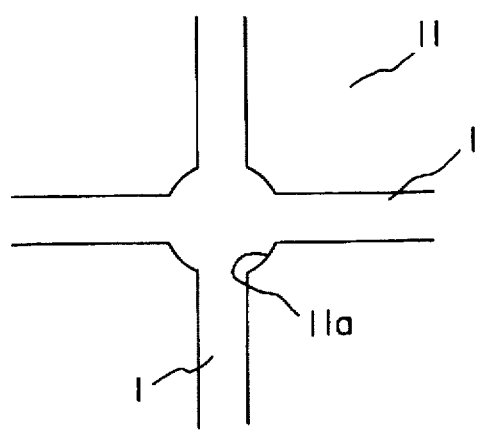
FIG. 5 is an enlarged plan view illustrating a state in which the corner portion of the cell is machined by an electrolytic machining in a non-R region in FIG. 4.
Figure 6:
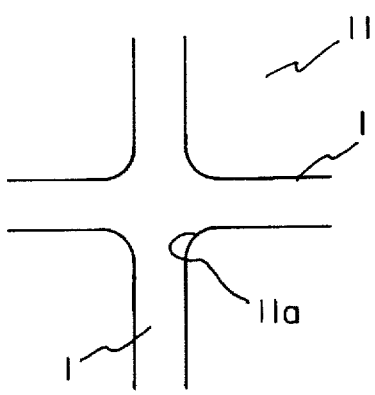
FIG. 6 is an enlarged plan view depicting a state in which the corner portion of the cell is machined by an electrolytic machining in an R region in FIG. 4.

FIGS. 5 and 6 are enlarged plan views showing a state in which the corner portion of the cell is machined by the electrolytic machining in the non-R region and the R region in FIG. 4, respectively. In FIGS. 5 and 6, portions similar to those of FIG. 3 are denoted by the same reference numerals in FIG. 3. In FIG. 5, the corner portion 11a of the cell 11 is lo machined into a concave shape corresponding to a shape of the electrode 15. That is to say, since the electrolytic machining condition is in the non-R region in FIG. 4, i.e. the applied time is larger, it is understood that the corner 11a is machined into an electrode shape. On the other hand, in FIG. 6, the corner portion 11a of the cell 11 is machined into an arcuate shape having a predetermined curvature. In the R region shown in FIG. 4, if the applied voltage and/or applied time are larger, a curvature of the corner portion 11a becomes larger correspondingly.

EXAMPLE

Figure 8A:
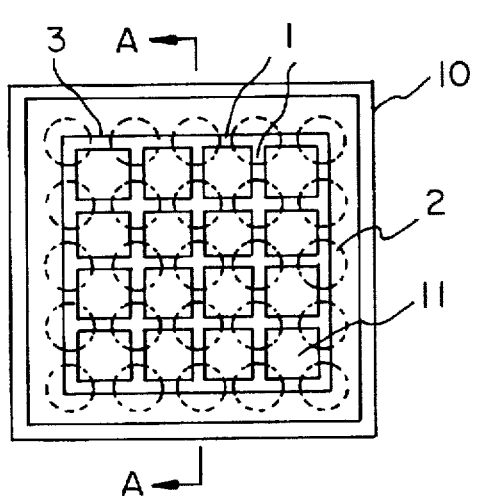
Figure 8B:
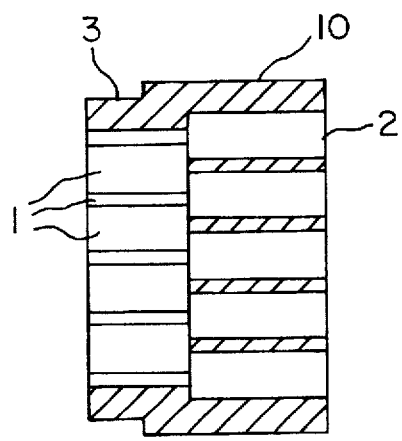
Figure 9:
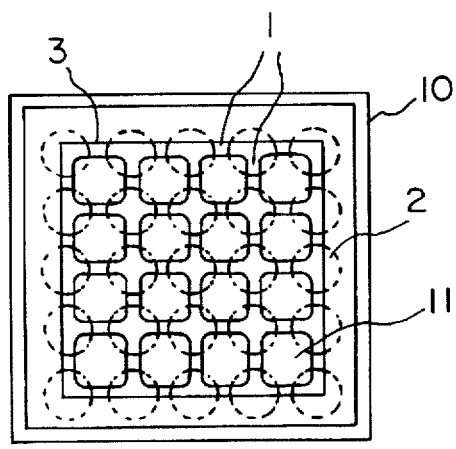
FIG. 9 is a plan view depicting a front side of the another embodiment of the known extrusion die.

At first, the extrusion die 10 made of a stainless steel (SUS630) having the construction shown in FIGS. 8a and 8b were prepared. In the thus prepared extrusion die 10, the forming channel 1 had a width of 0.20 mm and a depth of 3.0 mm, and the number of the cells 11 were 2400. Then, as shown in FIGS. 1 and 2, the electrolytic machining was performed by using the electrode 15 made of WC—Co series hard metal and having a diameter of 0.15 mm. In this electrolytic machining, 10 wt% of sodium nitrate solution was flowed at a rate of 8 l/min., the applied voltage was 20 V, and the applied time was 5 seconds. As a result, the corner portion 11a of the cell 11 was machined into an arcuate shape having a curvature of 0.05 mm and a machining precision was within 0.008 mm. Moreover, the electrode 15 was not worn at all.

Next, the electrolytic machining was performed for the other extrusion die 10 having the same construction. In this case, the electrolytic machining conditions were same as those of the example mentioned above except that the forming channel 1 had a width of 0.10 mm, the electrode 15 had a diameter of 0.10 mm, the applied voltage was 16 V, and the applied time was 3 seconds. As a result, the corner portion 11a of the cell 11 was machined into an arcuate shape having a curvature of 0.05 mm and a machining precision was within 0.005 mm. Moreover, the electrode 15 was not worn at all as is the same as the example mentioned above.

Figure 7:
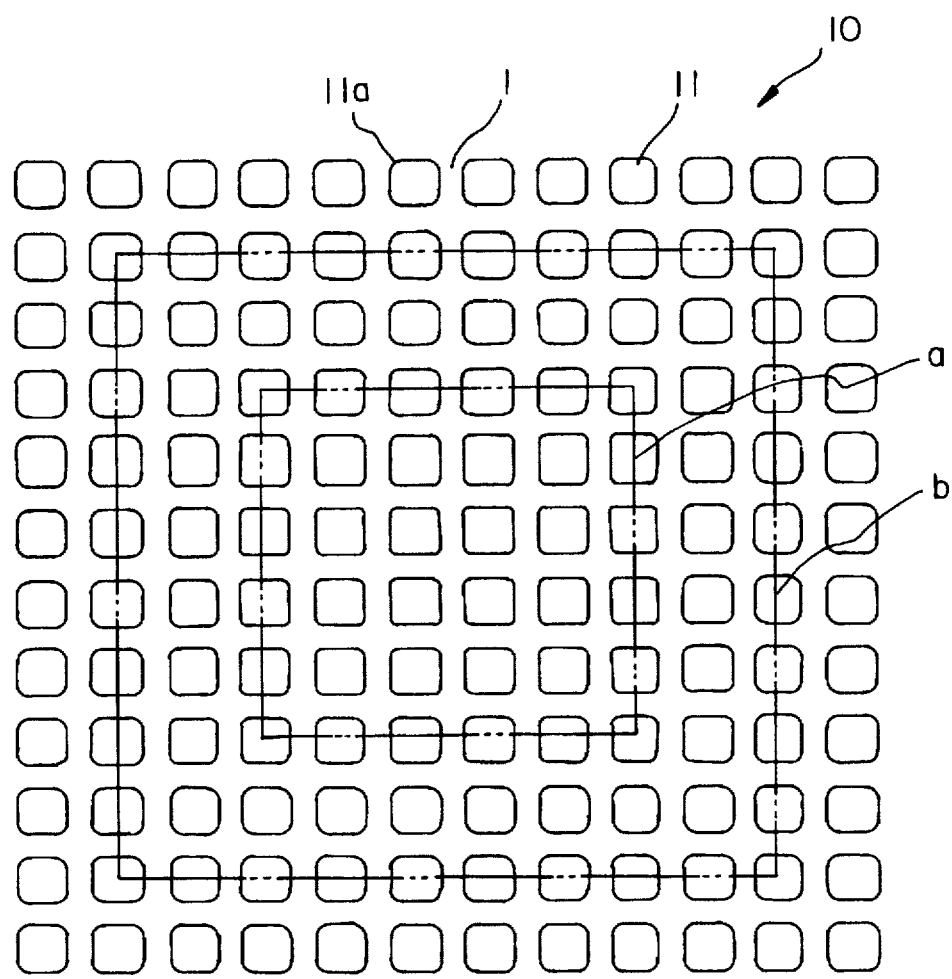
FIG. 7 is a plan view showing a main portion of an extrusion die in which a curvature of the machined corner portion is different from each other in the same extrusion die.

FIG. 7 is a plan view showing a main portion of an extrusion die in which a curvature of the machined corner portion is different from each other in the same extrusion die. In FIG. 7, portions similar to those of FIG. 1 are denoted by the same reference numerals in FIG. 1. In FIG. 7, a curvature of the corner portion 11a existing in a center region surrounded by a one-dotted chain line (a) is for example 0.04 mm. Moreover, a curvature of the corner portion 11a existing in a region between one-dotted chain lines (a) and (b) is for example 0.06 mm. Further, a curvature of the corner portion 11a existing in a region outside of a one-dotted chain line (b) is for example 0.08 mm.

In order to make a curvature of the corner portion 11a of the cell 11 different from each other in the same extrusion die as mentioned above, it is preferred to vary a diameter of the electrode shown in FIGS. 1 and 2 i.e. to vary a distance between the electrode 15 and the cell 11. Moreover, in the case of using the electrode 15 having the same diameter, it is preferred to vary the applied voltage and/or the applied time in the R region shown in FIG. 4.

Figure 11:
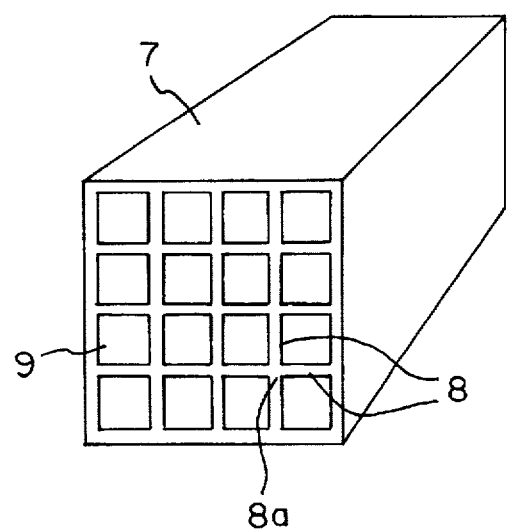
FIG. 11 is a perspective view illustrating one embodiment of the honeycomb structural body.
Figure 12:
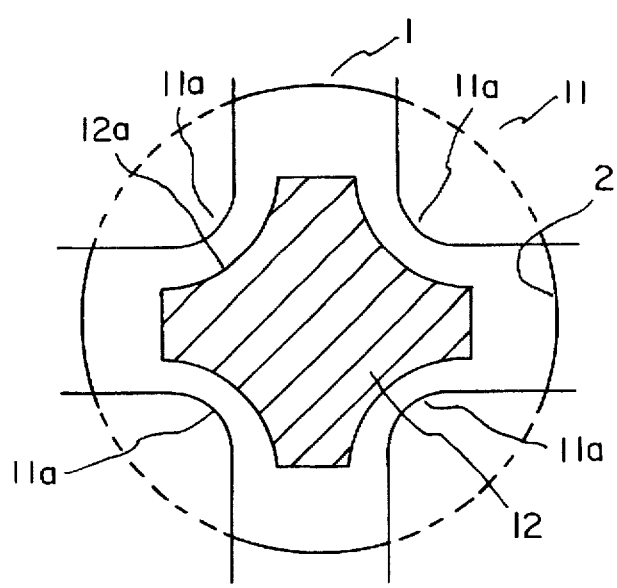
FIG. 12 is an enlarged plan view depicting a state in which the corner portion of the cell is machined by an electrical discharge machining according to the known method.

As mentioned above, it is very advantageous for the honeycomb structural body obtained by using the extrusion die mentioned above that a curvature of the corner portion 11a is gradually or stepwisely larger from the center portion to the peripheral portion. That is to say, as the honeycomb structural body, it is preferred to make a surface area of the through hole 9 shown in FIG. 11 larger. Therefore, it is not preferred essentially to arrange a projection portion having an arcuate shape at a corner of the through hole 9.

However, in the present invention, it is necessary to form the projection portion having an arcuate shape so as to eliminate a stress concentration generated due to a difference of a thermal conductivity between the center portion and the peripheral portion when heating, cooling and actually using the honeycomb structural body 7 or to improve a strength of the honeycomb structural body 7. Therefore, it is preferred to make a curvature of the arcuate shape as small as possible.

On the other hand, since a stress concentration due to the thermal conductivity difference at the center portion of the honeycomb structural body is smaller than that of the peripheral portion, a curvature of the arcuate shape at the center portion of the honeycomb structural body can be made smaller than that of the peripheral portion. Therefore, it is advantageous to vary a curvature of the corner portion 11a of the cell 11 as shown in FIG. 7, since a full function of the honeycomb structural body can be achieved and a fracture of the honeycomb structural body can be prevented during a manufacturing operation and a actually using state.

In the embodiments mentioned above, a positioning means of the electrode 15 is not explained, but it is possible to position the electrode 15 by using a known NC controller. In this case, from a machining efficiency point of view, it is preferred to perform the electrolytic machining by using a plurality of the NC controllers at the same time. Moreover, in order to improve a stiffness of the electrode 15, it is preferred to make the electrode 15 into a stick shape having a stepwisely different diameter along a longitudinal direction in which a diameter of an upper portion of the electrode 15 is larger than that of an insertion portion which is inserted into the forming channel 1. Further, it is preferred to use a solid electrode 15 or a hollow cylindrical electrode 15.

Furthermore, in the embodiments mentioned above, a plan shape of the cell to be arranged in the extrusion die is a square, but it is possible to use the extrusion die having the other plan shape such as a quadrangle, a triangle and a hexagonal shapes. Moreover, in the embodiment mentioned above, a negative terminal (−) is connected to the electrode and a positive terminal (+) is connected to the extrusion die. However, in order to prevent an adhesion of the machining scraps, it is preferred to flow a current inversely or regularly and pulsatory (ON-OFF).

Moreover, in the embodiment mentioned above, 10 wt% of sodium nitrate solution is used as the electrolytic solution, but it is not limited. For example, it is possible to use conductive solutions such as neutral electrolytic solution (salt solution etc.), acid electrolytic solution (sulfuric acid solution, nitric acid solution, hydrochloric acid solution, etc.), alkaline electrolytic solution (caustic soda solution, etc.), and so on. Further, in the embodiment mentioned above, the base 13 is used as a supporting tool for passing the electrolytic solution, but it is not limited. For example, all the supporting means which can flow the electrolytic solution as shown in FIG. 2 can be used for this purpose.

As clearly understood from the above, according to the present invention, the following advantages can be obtained.

(1) As the electrode used for the electrolytic machining, it is possible to use the electrode having a simple circular shape in a traverse cross section. Therefore, the electrode can be manufactured easily. Moreover, since the electrode is not worn at all during the machining, it is possible to improve a machining precision largely.

(2) Since the electrode can be manufactured easily, no skilled person is necessary. Moreover, since the electrode is not worn and further the electrode can be used for the other extrusion die, it is possible to largely reduce the number of the electrodes to be prepared. Therefore, it is possible to reduce the manufacturing cost and to control the electrode easily.

(3) If a width of the forming channel is very narrow, it is possible to machine the corner of the cell easily in a highly precision manner.

(4) If a curvature of the corner of the cell is varied, such a machining can be performed by the same electrode by changing a machining condition such as the applied voltage and/or the applied time etc. during the electrolytic machining.

(5) In the same extrusion die, it is easy to machine the corner of the cell having a different curvature.

What is claimed is:

1. A method of manufacturing an extrusion die for extruding a honeycomb structural body, comprising the steps of:
    forming a plurality of intersecting forming channels in a front surface of a metal blank, said forming channels defining a pattern in a transverse cross section corresponding to that of the honeycomb structural body;
    forming a plurality of raw material feeding holes in a back surface of the metal blank, each of the holes having a cylindrical shape extending independently from the back surface toward the front surface to provide fluid communication with the forming channels;
    inserting an electrode into intersecting portions of the forming channels, the electrode having a circular shape in a transverse cross section and a length corresponding to at least a depth of the forming channels;
    performing electrolytic machining via the electrode to round a corner portion of a cell surrounded by the forming channels; and
    controlling the electrolytic machining conditions such that the corner portion of each cell is rounded to an arcuate shape.

2. The method of claim 1, wherein the arcuate shape of the corner portion of the cell is formed by controlling at least one of an electrolytic solution, concentration thereof, temperature and flow mass thereof, distance between electrode and cell, applied voltage, and voltage applied time.

3. The method of claim 1, wherein a plurality of electrodes are used at the same time.

4. The method of claim 1, wherein the arcuate shape of the corner portion of the cell among at least two cells is different in the same extrusion die.

5. The method of claim 1, wherein a width of each forming channel is set to 0.05–0.3 mm.

* * * * *